United States Patent Office 3,109,006
Patented Oct. 29, 1963

3,109,006
BENZYL HETEROCYCLICAMINO-
CARBOTHIOLATES
Marion W. Harman, Dunbar, and John J. D'Amico,
Charleston, W. Va., assignors to Monsanto Chemical
Company, St. Louis, Mo., a corporation of Delaware
No Drawing. Filed July 3, 1961, Ser. No. 121,369
6 Claims. (Cl. 260—326.5)

This invention relates to benzyl heterocyclicamino-carbothiolates, especially benzyl 1-pyrrolidine- and 1-piperidinecarbothiolates having the property of destroying undesired vegetation.

General objects of the invention are to provide compositions which are toxic to living plants and to provide methods for their use to accomplish various desirable ends. A further general object is to provide compositions and methods for the destruction of noxious vegetation. Another object is to destroy noxious vegetation either in the form of germinating seeds or by application of the toxicant to the foliage after emergence. Another object is to provide a method for controlling broadleaved plants. A further object is to provide new compounds which are outstandingly effective herbicides and to provide methods for preparing them. A particular object of the invention is to provide toxicants which combine a hormonelike action on broadleaved plants and severe phytotoxicity to grasses.

The ester radical in the new compounds is benzyl, methylbenzyl, or halogenated benzyl containing not more than four halogen atoms. The halogen substituents where present are preferably chlorine but bromine and to a lesser extent fluorine and iodine are also suitable. Examples of suitable ester groups comprise benzyl, 2,6-dibromobenzyl, 2,3,4-trichlorobenzyl, 2,3,6-trichlorobenzyl, 2,6-dimethylbenzyl, 2,5-dimethylbenzyl, 5-chloro-2-methoxybenzyl, o-chlorobenzyl, m-chlorobenzyl, p-chlorobenzyl, 2,3-dichlorobenzyl and 2,3,5,6-tetrachlorobenzyl. The amino substituent may be derived from pyrrolidine, piperidine, 5-ethyl-2-methylpiperidine, morpholine or 1,2,5,6-tetrahydropyridine.

The halongenated benzyl esters of this invention may be prepared by condensing a halogenated benzyl halide with a salt of the appropriate thiolcarbamic acid. A useful intermediate, ar,ar,ar-trichlorobenzyl chloride, may be prepared by the following procedure: Substantially 1500 parts by weight of dry toluene was charged into a chlorinator of suitable capacity. Substantially 15 parts by weight of iron filings were added as catalyst carrier for ring chlorination and chlorine introduced at about 20° C. During the last part of the run the temperature was increased to about 70° C. in order to keep the mixture fluid and the flow of chlorine continued until the increase in weight corresponded to that calculated for trichlorotoluene. Thus, when the product analyzed 54.8% chlorine, the flow of chlorine was interrupted and the trichlorotoluene given a 10% caustic wash and filtered through a bed of clay in order to remove the iron. Alternatively, the iron may be removed by distillation of the chlorinated product. The product was then chlorinated at 160° C. in the presence of ultraviolet light until the gain in weight was that calculated for trichlorobenzyl chloride. Analysis of the product for chlorine at this point gave 61.8%.

Although some of the halobenzyl chlorides are new compounds, they may be prepared by well known principles of organic chemisty. α-2,4,5-tretrachlorotoluene was prepared by the chlorination of 2,4,5-trichlorotoluene. 1.1 grams of benzoyl peroxide was added to 237 grams of 2,4,5-trichlorotoluene, M.P. 82.5° C., dissolved in 250 ml. of carbon tetrachloride. There was then added 164 grams of sulfuryl chloride. The solution was heated up very slowly over a period of about 3 hours to 77° C. and then kept at refluxing temperature (77° C.) for a period of 4 hours. The solvent and sulfuryl chloride were removed by distillation and the residue distilled in vacuo and then fractionated. α-2,4,5-tetrachlorotoluene was obtained as a colorless liquid with a boiling point of 102–104° C. at 2 mm. Hg.

α-2,4,6-tretrachlorotoluene was prepared by adding chlorine to 723 grams of 2,4,6-trichlorotoluene, M.P. 33–34° C. The trichlorotoluene was placed in a flask equipped with a stirrer, condenser, thermometer and a bubbler tube and heated to 90° C. at which temperature 132 grams of chlorine were added over a 2½ hour period. It was necessary to supply a small amount of heat to hold the temperature between 190–198° C. during chlorination. The product was then fractionated and α-2,4,6-tetrachlorotoluene collected as a colorless liquid, boiling point 123–126° C. at 8 mm. Hg.

In a similar manner, α-2,3,6-tetrachlorotoluene was prepared by introducing 98 grams of chlorine into 546 grams of 2,3,6-trichlorotoluene, M.P. 41–42° C. at a temperature of 190–198° C. The product was collected as a colorless liquid by fractional distillation, M.P. 132–135° C. at 10 mm. Hg.

α-2,3,4-tetrachlorotoluene was prepared by light catalyzed chlorination of 2,3,4-trichlorotoluene. 283 grams of the trichlorotoluene was heated to 180° C. and then with a sunlamp 8 to 10 inches from the pot, 50 grams of chlorine added over 40 minutes at 180 to 200° C. The product was distilled in vacuo to yield α-2,3,4-tetrachlorotoluene as a colorless liquid, B.P. 137–142° C. at 10 mm. Hg.

α-2,5-trichlorotoluene was prepared by light catalyzed chlorination of 2,5-dichlorotoluene in a manner similar to that described. The desired product was isolated by fractional distillation as a colorless liquid, B.P. 132–136° C. at 25 mm. Hg.

One procedure by which the new toxicants were prepared was to add 19 grams (0.27 mole) of 85% carbonoxysulfide to a stirred solution of 0.3 mole of the amine, 50 ml. of water and 40 grams (0.25 mole) of 25% sodium hydroxide at 0–7° C. over a 30 minute period. There was then added in one portion 0.25 mole of the benzyl halide and the mixture stirred and maintained for one hour periods at each of the following temperatures: 0–5° C.; 5–10° C.; 10–15° C.; 15–20° C.; 20–25° C. and then for 19 hours at 25–30° C. Thereupon the reaction mixture was extracted with 400 ml. of ethyl ether, the ether solution washed with water until neutral to litmus and dried over sodium sulfate. The ether was removed in vacuo at a maximum temperature of 80–90° C./1–2 mm. Hg.

Substituting the appropriate amine and benzyl halide the following were prepared by the foregoing procedure:

2,3,6 - trichlorobenzyl 1 - pyrrolidinecarbothiolate in 76.5% yield as an amber semi-solid. Analysis gave 9.46% sulfur compared to 9.88% calculated for $C_{12}H_{12}Cl_3NOS$.

ar,ar,ar-Trichlorobenzyl 1-pyrrolidinecarbothiolate in 74.4% yield as an amber semi-solid.

Benzyl 1-pyrrolidinecarbothiolate in 94.5% yield as an amber oil analyzing 5.97% nitrogen compared to 6.33% calculated for $C_{12}H_{15}NOS$.

To a stirred charge comprising 34.1 grams (0.4 mole) of piperidine, 40 grams (0.25 mole) of 25% sodium hydroxide and 100 ml. of water was added at 0–10° C. over a 30 minute period 19.5 grams (0.275 mole) of 85% carbonoxysulfide. Then 57.5 grams (0.25 mole) of 2,3,6-trichlorobenzyl chloride was added in one portion at 0° C. and the mixture maintained an hour at 0–10° C., a second hour at 10–15° C., a third hour at 15–20° C., a fourth hour at 20–25° C. and 20 hours at 25–30° C. Thereupon there was added 200 ml. of water and 300 ml. of ethyl ether and the mixture stirred for 15 minutes. The ether layer was separated, washed with water until neutral to litmus and dried over sodium sulfate. The ether was removed in vacuo at a maximum temperature of 80–90° C./1–2 mm. 2,3,6-trichlorobenzyl 1-piperidinecarbothiolate was obtained in 74.5% yield as an amber oil. This product was restripped at a maximum pot temperature of 165° C./2–3 mm. to yield a compound analyzing 3.23% nitrogen and 9.51% sulfur compared to 4.14% nitrogen and 9.47% sulfur calculated for $$C_{13}H_{14}Cl_3NOS$$

Substituting 31.6 grams (0.25 mole) of benzyl chloride for the 2,3,6-trichlorobenzyl chloride in the foregoing sample, the mixture was maintained one hour at 0–10° C., a second hour at 10–15° C., a third hour at 15–20° C., a fourth hour at 20–25° C. and a fifth hour at 25–30° C. The product was then isolated as described in the foregoing example. Benzyl 1-piperidinecarbothiolate was obtained in 88.4% yield as an amber oil. Analysis gave 13.95% sulfur compared to 13.63% calculated for $C_{13}H_{17}NOS$.

To a stirred charge comprising 21.3 grams (0.3 mole) of pyrrolidine, 40 grams (0.25 mole) of 25% sodium hydroxide and 50 ml. of water was added at 0–7° C. over a 30 minute period 19 grams (0.27 mole) of 85% carbonoxysulfide. Then 48.8 grams (0.25 mole) of 2,6-dichlorobenzyl chloride was added in one portion and the mixture maintained one hour at 0–5° C., a second hour at 5–10° C., a third hour at 15–20° C., a fourth hour at 20–25° C. and 20 hours at 25–30° C. Thereupon the mixture was cooled to 0° C., the precipitate collected by filtration, washed with water until neutral to litmus and air-dried at 25–30° C. 2,6-dichlorobenzyl 1-pyrrolidinecarbothiolate was obtained in 62% yield as a pink solid. It melted at 110–112° C. after recrystallization from alcohol. Analysis gave 4.80% nitrogen, 11.40% sulfur and 24.63% chlorine compared to 4.83% nitrogen, 11.05% sulfur and 24.44% chlorine calculated for $C_{12}H_{13}Cl_2NOS$.

The new compounds are highly efficient pre-emergence herbicides when applied to the soil medium. The toxicants may be applied to the soil conveniently in the form of a spray containing the active ingredients in a concentration within the range of 0.1–10% by weight. Amounts within the range of ½ to 60 pounds comprise the useful range under most conditions. As illustrative of their properties the toxicants were applied as aqueous sprays to aluminum pans seeded to various plant species. The seeds usually included morning glory, wild oats, brome grass, rye grass, radish, sugar beets, foxtail, crab grass, pigweed, soybean, wild buckwheat, tomato and sorghum. About 14 days after application of the toxicants results were observed and recorded. The number of seeds emerging was converted to weighted herbicidal ratings based on average percent germination of any particular seed lot times an injury factor. This evened irregularities of herbicide ratings of seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale.

| Percent emergence: | Phytotoxicity rating |
|---|---|
| 0–25 | 3 |
| 26–50 | 2 |
| 51–75 | 1 |
| 76–100 | 0 |

The numerical ratings for each test species were then added to provide a measure of total phytotoxicity. It will be noted from the table below that the thiolates are much superior to dithiocarbamates. In the case of the fifth and sixth compounds the toxicants were incorporated into the soil used to cover the seeds instead of spraying on the surface. This enhances toxicity.

| | Dosage Lbs./acre | Total of Phytotoxicity Ratings |
|---|---|---|
| Benzyl 1-piperidinecarbothiolate | 1 | 9 |
| Benzyl 1-piperidinecarbodithioate | 1 | 0 |
| 2,3,6-trichlorobenzyl 1-piperidinecarbothiolate | 1 | 9 |
| 2,3,6-trichlorobenzyl 1-piperidinecarbodithioate | 1 | 5 |
| Benzyl 1-pyrrolidinecarbothiolate | 5 | 22 |
| Benzyl 1-pyrrolidinecarbodithioate | 5 | 7 |
| 2,6-dichlorobenzyl 1-pyrrolidinecarbothiolate | 5 | 10 |
| 2,6-dichlorobenzyl 1-pyrrolidinecarbodithioate | 5 | 0 |
| 2,3,6-trichlorobenzyl 1-pyrrolidinecarbothiolate | 5 | 23 |
| 2,3,6-trichlorobenzyl 1-pyrrolidinecarbodithioate | 5 | 0 |
| ar,ar,ar-Trichlorobenzyl 1-pyrrolidinecarbothiolate | 5 | 17 |
| ar,ar,ar-Trichlorobenzyl 1-pyrrolidinecarbodithioate | 5 | 0 |

It is intended to cover all changes and modifications of the examples of the invention herein chosen for purposes of disclosure which do not constitute departures from the spirit and scope of the invention.

This application is a continuation-in-part of application Serial No. 657,051, filed May 6, 1957, now U.S. Patent No. 2,992,091.

What is claimed is:

1. A compound of the formula $$R-S-\overset{\overset{O}{\|}}{C}-R'$$

where R is selected from the group consisting of benzyl, methylbenzyl, halogenated benzyl of less than five halogen atoms and 5-chloro-2-methoxybenzyl and R' is selected from a group consisting of 1-pyrrolidinyl, 1-piperidinyl, 5-ethyl-2-methyl-1-piperidinyl, 4-morpholinyl and 1,2,5,6-tetrahydro-1-pyridyl.

2. A compound of the formula $$R-S-\overset{\overset{O}{\|}}{C}-N\begin{matrix}CH_2CH_2\\ \\CH_2CH_2\end{matrix}$$

where R is chlorinated benzyl of less than five chlorine atoms.

3. 2,3,6-trichlorobenzyl 1-pyrrolidinecarbothiolate.
4. 2,6-dichlorobenzyl 1-pyrrolidinecarbothiolate.
5. ar,ar,ar-Trichlorobenzyl 1-pyrrolidinecarbothiolate.
6. Benzyl 1-pyrrolidinecarbothiolate.

References Cited in the file of this patent
UNITED STATES PATENTS

| 2,259,869 | Allen | Oct. 21, 1941 |
| 2,812,247 | Gysin et al. | Nov. 5, 1957 |

OTHER REFERENCES

Weibull: "Arkiv Kemi Mineral Geol., 25A, No. 9, 16 pages (1947).